(No Model.) 2 Sheets—Sheet 1.
P. DIEHL.
ELECTRIC MOTOR.
No. 381,222. Patented Apr. 17, 1888.
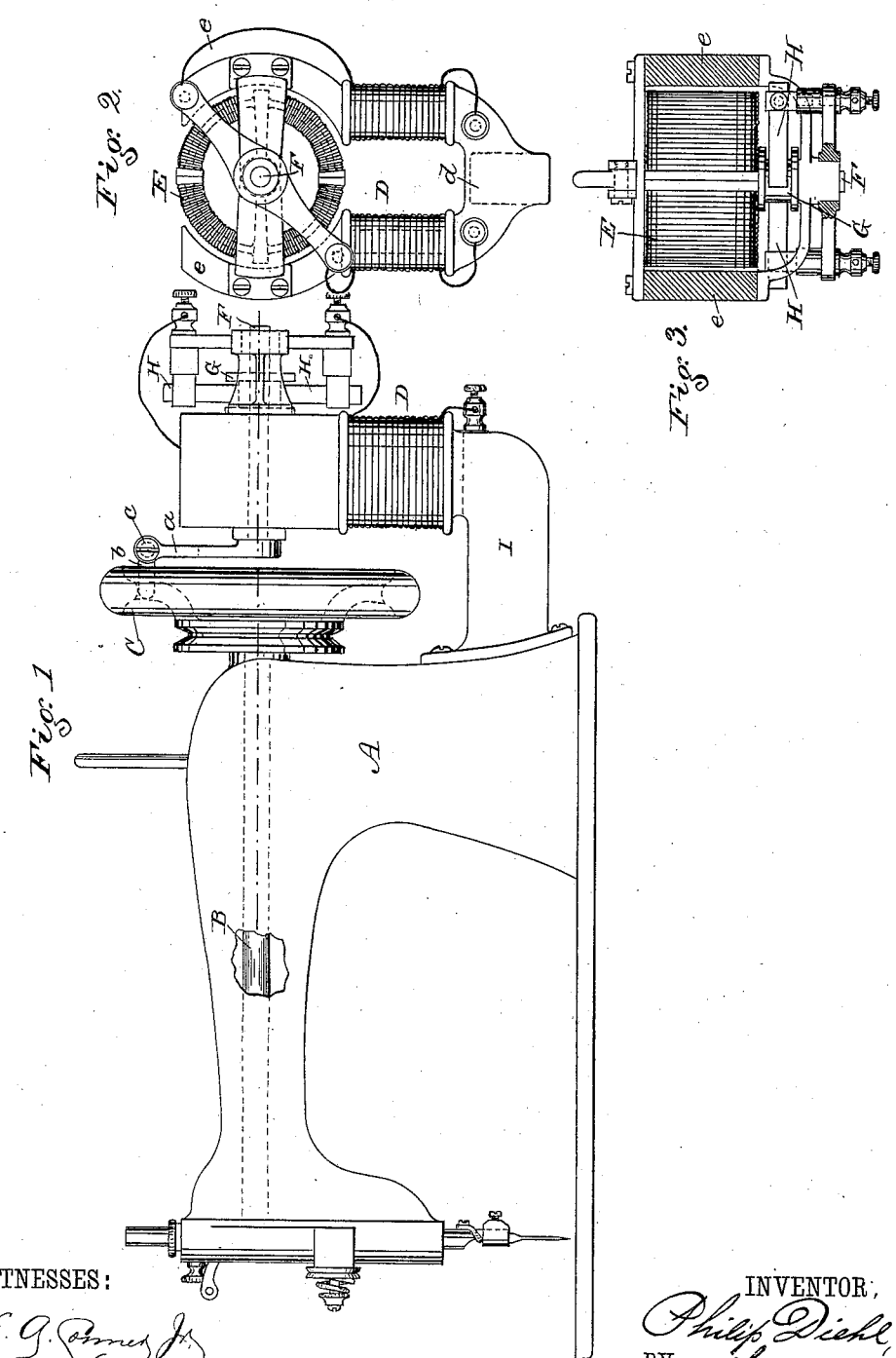
WITNESSES:
INVENTOR,
Philip Diehl
BY
ATTORNEY

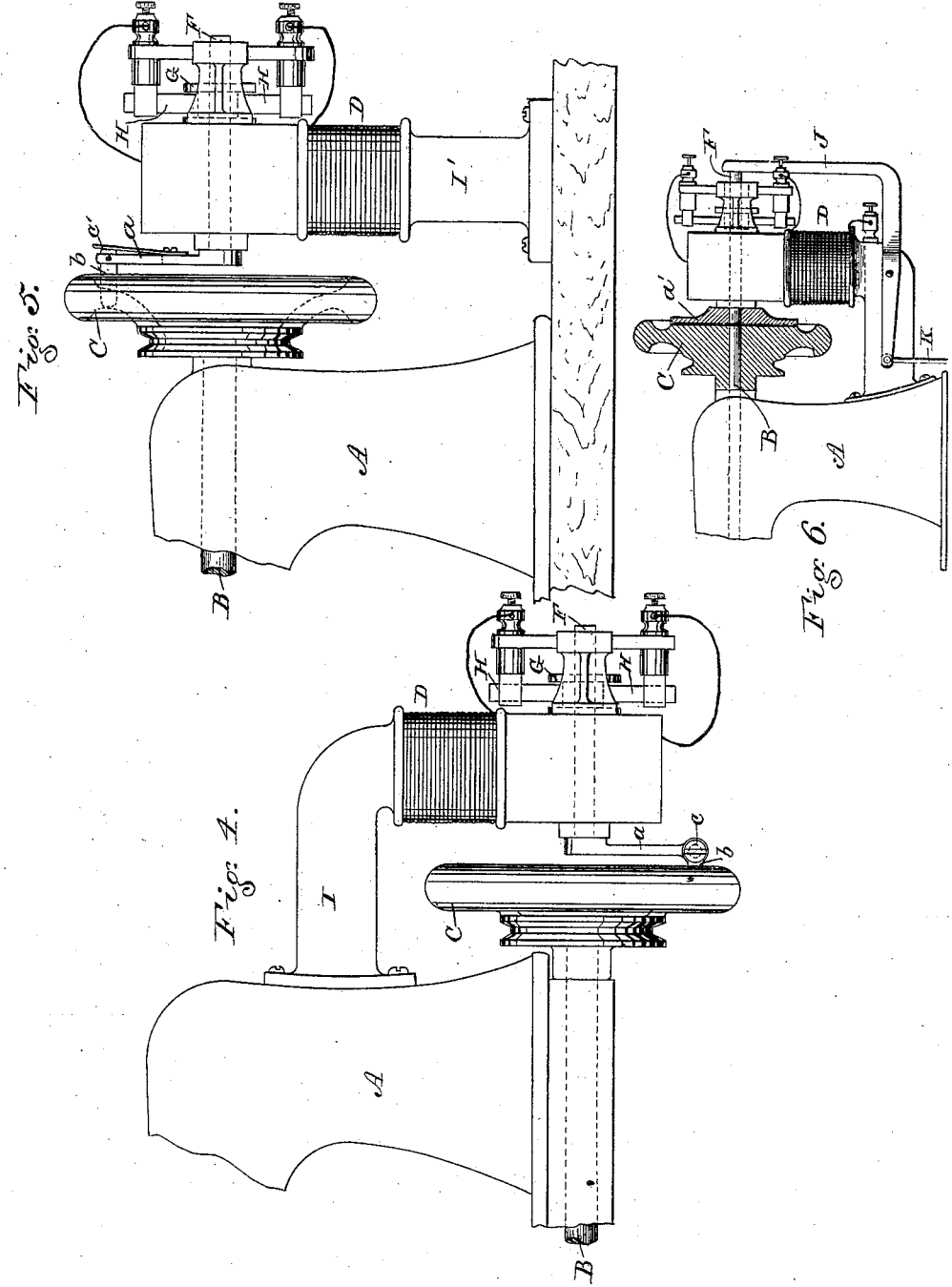

UNITED STATES PATENT OFFICE.

PHILIP DIEHL, OF ELIZABETH, NEW JERSEY.

ELECTRIC MOTOR.

SPECIFICATION forming part of Letters Patent No. 381,222, dated April 17, 1888.

Application filed March 3, 1887. Serial No. 229,558. (No model.)

*To all whom it may concern:*

Be it known that I, PHILIP DIEHL, a citizen of the United States, residing at Elizabeth, in the county of Union and State of New Jersey, have invented certain new and useful Improvements in Electric Motors, of which the following is a specification, reference being had therein to the accompanying drawings.

My invention relates to that class of electric motors (such as is shown by my Patent No. 356,576, dated January 25, 1887) more particularly adapted for driving sewing and other similar small machines, although my invention is capable of use in connection with heavier machines, if desired.

The object of my invention is to provide such a construction that a complete independent motor may be coupled directly with the machine or shaft to be driven, without the use of belts or gearing.

To this end my motor, comprising the usual armature, field-magnet, brushes, commutator, and electrical connections, is sustained by a suitable support or bracket, and is so arranged that the motor shaft is centrally in line with the main shaft of the machine to be driven, so that the motor-shaft may be coupled with the machine-shaft by any well-known clutch or crank connections, without the use of belts or gearing. The motor may thus be conveniently coupled directly with the shaft of the machine to be driven, when necessary, and may be uncoupled therefrom when it is desired to run either the machine or motor independently of the other.

In the drawings, Figure 1 is a side view of a sewing-machine with my invention applied thereto. Fig. 2 is a view of the motor detached from its supporting-bracket. Fig. 3 is a top view of the motor, partly in horizontal section. Figs. 4, 5, and 6 illustrate modifications of my invention.

A denotes the bracket-arm of a sewing-machine; B, the main shaft, and C the fly-wheel thereof. The electric motor, which is or may be of any well-known form, consists, as herein shown, of a field-magnet, D, a circular Gramme armature, E, partly inclosed by segmental pieces $e$, and connected, as usual, with the motor-shaft, F, a commutator, G, brushes H, and suitable binding-screws and electrical connections.

The motor is sustained by a support in such a manner that its shaft is centrally in line with the shaft of the machine to be driven. The motor-support may consist of a bracket, I, attached to the standard of the bracket-arm of the machine, as shown in Figs. 1 and 4, or of an independent standard, I', secured to the table on which the machine is mounted, as shown in Fig. 5.

The motor-shaft is shown in the present instance as being connected with the machine fly-wheel C by a crank-arm, $a$, having a dog, $b$, the latter being secured to the crank-arm by a screw, $c$; but it will be understood that the connection between the motor-shaft and the shaft to be driven may be made of any suitable clutching device, providing the motor-shaft is centrally in line with the shaft to be driven.

The body or core of the field-magnet D may be integral with the bracket or standard by which the motor is supported, or it may consist of a socketed piece, $d$, as shown in Fig. 3, adapted to be removably attached to the motor-support; and the latter preferably consists of the bracket I, adapted to be attached to the arm of the machine, as my motor may thereby conveniently be applied to machines now in common use. By loosening the screw $c$ the dog $b$ will be loosened, so that it may be turned out of engagement with the fly-wheel C, and the machine or motor may then be run independently of each other.

In the modification shown by Fig. 5 the dog $b$ is retained in position by a spring, $c'$, which permits the said dog to be turned out of engagement with the wheel C when it is desired to disconnect the motor from the machine to permit the latter to be turned up on its hinges, or for any other purpose.

In the modification shown by Fig. 6 the connection between the fly-wheel C and the motor-shaft F is made by the friction-wheel $a'$, secured on the said shaft, the latter being adapted to have a limited endwise movement, so that the friction-wheel may be forced into contact with the fly-wheel by the lever J, to which is attached a rod or cord, K, connected with a suitable treadle. It will of course be understood that any well-known form of friction-clutch may be employed instead of that herein shown.

In all of these forms of my invention it will be observed that the motor-shaft is separate from the main shaft of the sewing-machine, but is adapted to be connected directly therewith, thereby obviating the necessity of running a belt from the motor to the sewing-machine, or of driving the latter from a pulley located beneath the table of the machine, as has usually been the custom heretofore in driving sewing-machines from electric motors. I am aware, however, that it has been proposed to run sewing-machines by electric motors attached directly to the main shafts of the machines; but in such instances the motors could not be disconnected from the machines when it was desired to run the latter a little by hand, as is frequently desirable in commencing to sew, or when, for any reason, it was desired to drive the machines from the treadles in the usual manner. These difficulties are all obviated by my invention, as I support the motors by brackets attached either directly to the sewing-machine arms or to the tables which sustain the machines in such manner that the motor-shafts are in exact or practical alignment with the main shafts of the machines, and are detachably connected with the said main shafts, so that the machines may be run separately from the motors when desired.

While I prefer to arrange the motor-shaft in exact alignment with the shaft to be driven, it will be practicable, with such connections as are herein shown, to operate the driven shaft, if the motor-shaft be not centrally in line therewith, if the adjustment of the parts be such that these shafts are approximately in line with each other. I do not, therefore, wish to be understood as limiting my invention to an exact alignment of the motor and driven shafts, as a slight variation in this respect may be made without departing from the spirit of my invention.

Having thus described my invention, I claim and desire to secure by Letters Patent—

1. The combination, with the arm and main shaft of a sewing-machine, of an electric motor having its shaft separate from but centrally in line with the said main shaft, or approximately so, a supporting-bracket for said motor, and suitable detachable connections between the motor-shaft and main shaft, substantially as set forth.

2. The combination, with the arm and main shaft of a sewing-machine, of an electric motor having its shaft separate from but centrally in line with the said main shaft, a supporting-bracket for said motor attached to said arm, and suitable connections between the motor-shaft and main shaft, substantially as set forth.

3. The combination, with the sewing-machine main shaft B and fly-wheel C, of the electric motor, the shaft F of which is centrally in line with the said shaft B, said motor-shaft having the crank-arm $a$, provided with the dog $b$, adapted to engage and rotate said fly-wheel, substantially as set forth.

4. The combination, with the motor support or bracket, of the socketed field-magnet core-piece $d$, adapted to be removably secured to said support or bracket, substantially as set forth.

In testimony whereof I affix my signature in presence of two witnesses.

PHILIP DIEHL.

Witnesses:
J. G. GREENE,
HENRY PRECHEUR.